E. L. J. DAVIS.
CUSHIONED WHEEL.
APPLICATION FILED SEPT. 23, 1910.
980,611.
Patented Jan. 3, 1911.
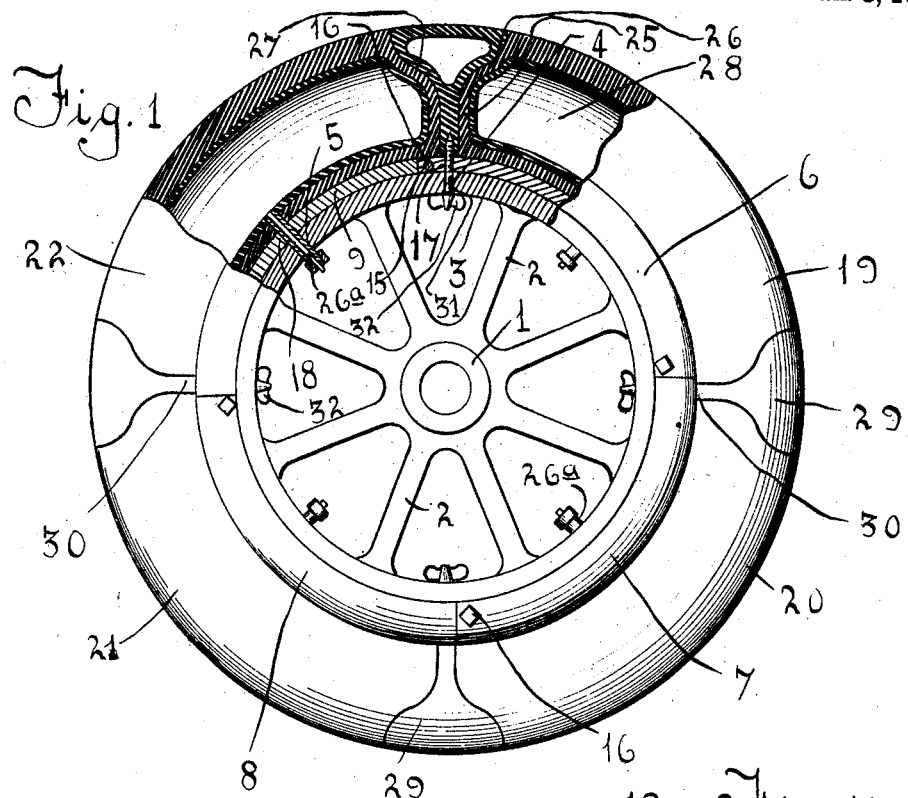
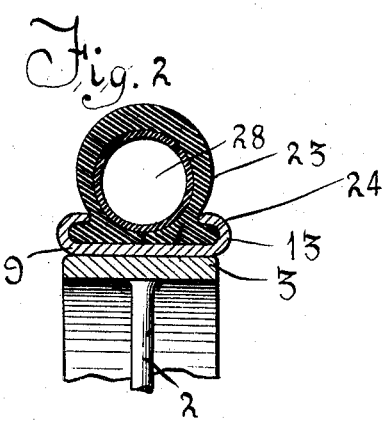
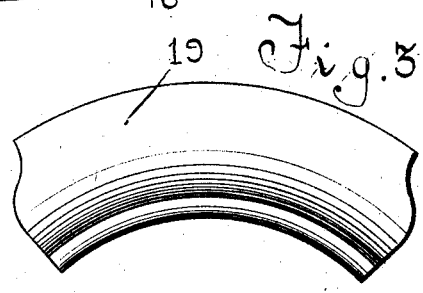
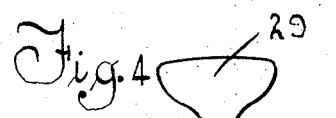
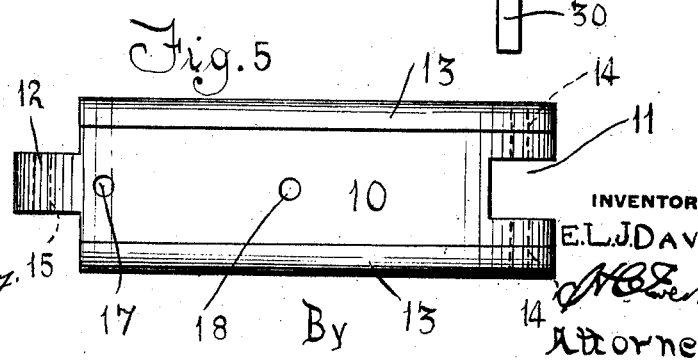
WITNESSES
Edwin Frey
John L. Stephany
INVENTOR
E. L. J. DAVIS
By
Attorneys

UNITED STATES PATENT OFFICE.

ERNEST L. J. DAVIS, OF PITTSBURG, PENNSYLVANIA.

CUSHIONED WHEEL.

980,611.  Specification of Letters Patent.  Patented Jan. 3, 1911.

Application filed September 23, 1910. Serial No. 583,374.

*To all whom it may concern:*

Be it known that I, ERNEST L. J. DAVIS, a citizen of the United States of America, residing at Pittsburg, in the county of Allegheny and State of Pennsylvania, have invented certain new and useful Improvements in Cushioned Wheels, of which the following is a specification, reference being had therein to the accompanying drawing.

This invention relates to cushioned wheels and has for its object to provide a wheel of such class with means in a manner as hereinafter set forth constituting a pneumatic tire formed of a plurality of independent separable cushioning sections whereby if one of the sections should become damaged, it can be removed and a new one substituted without necessitating the removal of all of the cushioning sections from the wheel.

Further objects of the invention are to provide a cushioned wheel of the pneumatic class which is comparatively simple in its construction and arrangement, durable, efficient in its use, readily assembled and disassembled when occasion so requires, strong, reducing tire cost to a minimum, and comparatively inexpensive to set up.

With the foregoing and other objects in view, the invention consists of the novel construction, combination and arrangement of parts as hereinafter more specifically described and illustrated in the accompanying drawings, wherein is shown one embodiment of the invention, but it is to be understood that changes, variations and modifications can be resorted to which come within the scope of the claim hereunto appended.

In the drawings wherein like reference characters denote corresponding parts throughout the several views: Figure 1 is a side elevation partly in section of a cushioned wheel in accordance with this invention. Fig. 2 is a cross-sectional view through the wheel tire, the remainder of the wheel being broken away. Fig. 3 is a side elevation of one of the tire shoes. Fig. 4 is an elevation of one of the combined filling and coupling members used as a filler between a pair of sections of the tire and for further coupling the sections with the rim, and, Fig. 5 is a top plan view of one of the sections of the rim.

A cushioned wheel in accordance with this invention comprises a body-portion, a sectional rim, a sectional tire, and a series of combined filling and coupling devices abutting with the sections of the tire. The body-portion of the wheel comprises a hub 1 having projecting therethrough a series of spokes 2 to which is connected a felly 3, the latter being provided with a series of openings 4 and a series of openings 5. The function of the openings 4, 5, will be hereinafter referred to.

Mounted upon the felly 3 is a rim formed of a plurality of sections, as shown 4, and which are indicated by the reference characters 6, 7, 8 and 9. Each of the rim sections is segmental in contour and as clearly shown in Fig. 5 consists of a body-portion 10 provided at one end with a recess 11 and at its other end with a tongue 12. The body-portion 10 at each side is formed with a clencher flange 13 adapted to engage the sections of the tire in a manner as hereinafter referred to for securing the tire sections in position. Each of the rim sections is furthermore provided with transversely-extending openings 14 at one end thereof, said openings being in alinement and adapted to register with the transversely-extending opening 15 formed in a tongue 12 of an adjacent section of the rim. The tongue 12 of an adjacent section of the rim is adapted to extend in the recess 1 of the other section and is connected thereto by a transversely-extending bolt 16. The rim sections when mounted circumferentially around the felly 9 abut as clearly shown in Fig. 1. Each of the rim sections is furthermore provided with an opening 17 which alines with one of the openings of the series of openings 4 and each of the rim sections is also provided with an opening 18 which alines with one of the openings of the series of openings 5.

The tire consists of a plurality of independent detachable sections, as shown by way of example, four in number and which are indicated by the reference characters 19, 20, 21 and 22. Each of the tire sections is substantially segmental in contour and is mounted against the rim section. Each of the tire sections consists of an outer shoe 23 provided with a pair of beads 24 which are clamped by the flanges 13 of the rim sections, whereby the tire sections and rim sections will be coupled together. Said shoe 23 is provided at each end with an end wall 25 having its outer portion extending inwardly so as to provide when the tire section is inflated, a beveled outer portion 26 forming an abutment. The opposing end walls of the pair of tire sections are oppositely disposed with respect to each other so that when the tire sections are mounted upon the rim, there will be formed between the opposing ends of each pair of tire sections, substantially Y-shaped spaces 27 for a purpose to be presently referred to. Arranged within the shoe of the tire section is an inner tube 28 which is segment-shaped in contour and has each of its ends closed and which when inflated conforms to the inner contour of the shoe 23. Extending through each of the openings of the series of openings 5 and each of the alining openings 18 and opening into the inner tube 28 is an air filling tube 26ª for each of the inner tubes of the tire section. The end walls of each tire section are oppositely disposed with respect to each other and as before stated oppositely disposed with respect to the opposing ends of the adjacent tire sections so as to provide the Y-shaped spaces 27 between each pair of tire sections.

Mounted in each of the spaces 27 is a combined filling and coupling member 29 which in vertical section is substantially Y-shaped in contour and in transverse section conforms in contour to the shape of a tire section when the latter is inflated. Each of the members 29 is hollow and when mounted in an opening 27 has its periphery flush with the periphery of the tire sections. The inner end 30 of each of the members 29 is solid and is adapted to be engaged by a threaded hold-fast device 31 which extends through an opening 4 and the alining opening 17 and at its outer end engaging in the solid portion 30 and has its inner end provided with a thumb nut 32 adapted to abut against the inner face of the felly. When the nuts 32 are screwed toward the inner face of the felly, the members 29 are drawn inwardly and engage the outer portions 26 of the end walls 25 of the tire sections, the said outer portions 26 constituting abutments, whereby the ends of the tire sections are maintained in position upon the rim and the Y-shaped space between each pair of tire sections is filled by a member 29 so that the tread of the tire will be continuous. The members 29 are also provided to allow of the convenient removal, when occasion so requires, of any one of the tire sections, if the same should become damaged, so that a new tire section can be mounted upon the rim without necessitating the removal of all of the tire sections. The rim sections are also detachably connected together so that they can be removed with their respective tire sections and the new tire sections conveniently positioned upon the rim sections and the latter with the tire sections then replaced upon the felly and detachably connected to a pair of adjacent tire sections. The rim sections are detachably connected together by the hold-fast devices 16, which as shown consist of headed bolts provided with clamping nuts, the nuts not being shown.

What I claim is:

A cushioned wheel comprising a felly, a rim mounted upon the felly and formed of a plurality of separately detachable sections, a resilient tire section coupled with each rim section, each of said tire sections provided with an end wall with the outer portion thereof inturned to provide a beveled outer portion, the end walls of each tire section spaced from the end walls of the adjacent tire section, thereby providing a Y-shaped space between each pair of tire sections, and a combined Y-shaped filling and coupling member mounted in each of said spaces and detachably connected to the felly and having its outer portion forming a continuation of the tread of the tire sections.

In testimony whereof I affix my signature in the presence of two witnesses.

ERNEST L. J. DAVIS.

Witnesses:
MAX H. SROLOVITZ,
KARL H. BUTLER.